No. 788,236. PATENTED APR. 25, 1905.
E. E. BARTHOLOMEW.
SAW.
APPLICATION FILED JUNE 22, 1904.
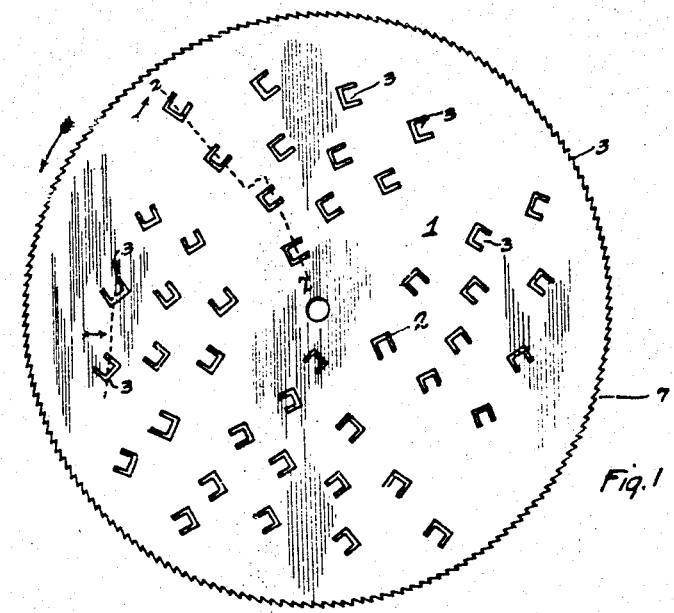
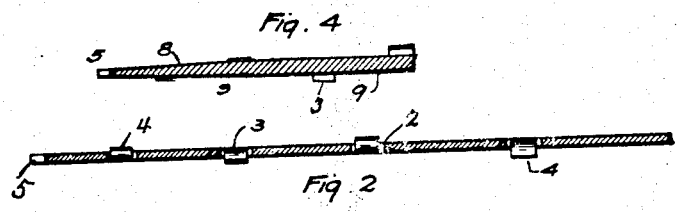
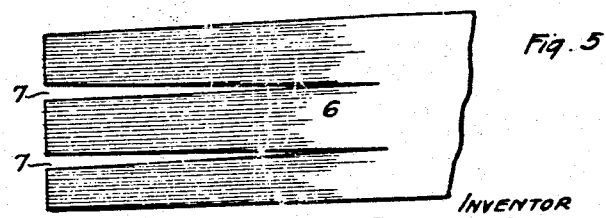
WITNESSES
INVENTOR
Eugene E. Bartholomew
By Fouts & Hull
ATTORNEYS No. 788,236. Patented April 25, 1905.

UNITED STATES PATENT OFFICE.

EUGENE E. BARTHOLOMEW, OF CLEVELAND, OHIO, ASSIGNOR TO THE SINGLE STAVE BARREL COMPANY, OF CINCINNATI, OHIO, A CORPORATION OF OHIO.

SAW.

SPECIFICATION forming part of Letters Patent No. 788,236, dated April 25, 1905.

Application filed June 22, 1904. Serial No. 213,610.

*To all whom it may concern:*

Be it known that I, EUGENE E. BARTHOLOMEW, residing at Cleveland, in the county of Cuyahoga and State of Ohio, have invented a certain new and useful Improvement in Saws, of which the following is a full, clear, and exact description, reference being had to the accompanying drawings.

My invention relates to saws, and particularly to a saw constructed to cut a V-shaped kerf—as, for example, a kerf such as is formed in the ends of a wide barrel-stave or of a single veneer barrel-blank, so as to provide for the contraction of the body of the barrel at the chime.

The object of my invention is to construct a saw of this character which shall be efficient in operation and simple and economical in construction.

The invention may be defined generally as consisting of the combinations of elements embodied in the claims hereto annexed.

Referring to the drawings, Figure 1 represents a side elevation of a saw embodying my invention. Fig. 2 is a transverse section on the line 2 2 of Fig. 1 looking in the direction of the arrow. Fig. 3 represents an enlarged sectional detail on the line 3 3 of Fig. 1 looking in the direction of the arrow. Fig. 4 represents a sectional detail showing a modification of the saw embodied in the preceding figure; and Fig. 5 represents a detail of a barrel-stave, showing the form of kerf cut by the saw.

While my invention might be applied to saws of other forms, I prefer a saw of the circular type, (designated by the numeral 1 in Fig. 1.) As will be apparent from an inspection of the drawings, this saw is provided with a number of cutters projecting from the body portion thereof. A convenient manner of forming such cutters is by cutting apertures 2 in the body of the saw and bending therefrom tongues 3. The edges 4 of such tongues are beveled to form cutting-surfaces, and such edges are obliquely disposed with reference to the direction of the cutting motion of the saw, whether the saw be circular, as shown, or of the ordinary straight-edge type. In the case of a circular saw the edges will be inclined with respect to the radii thereof as well as inclined with respect to the direction of the cutting motion of the saw. In both types of saw the inclination is such that the portion of the cutter edge adjacent to the teeth of the saw will be in advance of the other portions of said edge, whereby said cutter will readily shear through the stave or blank.

In forming the cutters the tongues are bent out alternately from opposite faces of the saw, are systematically arranged, and increase gradually and progressively in length from the circumference toward the center or inactive part of said saw, the number and arrangement of the tongues being such as to cause the saw to cut a substantially uniform V-shaped kerf, such as shown in Fig. 5.

In addition to the tongues 3 the saw is provided with the usual teeth 5. In operation the saw enters the stave or blank 6 from the end thereof, cutting the V-shaped kerfs 7 therein. I have not shown the manner of mounting the saw, as it may be used on any suitable frame and arbor, and a number of such saws may be mounted in gangs, if desired.

Where, owing to the number or size of the perforations in the saw, there is danger of unduly weakening the same, I may construct the saw in the manner shown in Fig. 4. As will appear from said figure, the portion of the body of the saw adjacent to the teeth 5 may gradually increase in thickness, as shown at 8, until the desired thickness for the body is secured, as shown at 9, to compensate for the weakening of the body due to the perforations therein.

From the foregoing description it will be apparent that I have produced a saw which is simple in construction and which will effectively prepare staves or blanks for shaping up into a barrel and which, owing to the sharpness of the cutters and the oblique disposition of the same, will produce a clean cut in the stave or blank without fraying or splintering the material.

Having described my invention, I claim—

1. A saw having cutters projecting laterally from the face thereof arranged in series from the cutting edge toward the inactive part, the cutters more remote from the edge projecting farther than those nearer the edge.

2. A saw having cutters projecting laterally from both faces thereof arranged in series from the cutting edge toward the inactive part, the cutters more remote from the edge projecting farther than those nearer the edge.

3. A circular saw having cutters projecting laterally from the face thereof arranged in series from the edge toward the center, the cutters nearer the center projecting farther than those nearer the edge.

4. A circular saw having cutters projecting laterally from both faces thereof arranged in series from the edge or perimeter toward the center, the cutters nearer the center projecting farther than those nearer the edge.

5. A circular saw having cutters projecting laterally from both faces thereof arranged in series from the edge or perimeter toward the center, the cutters nearer the center projecting farther than those nearer the edge and the amount of such projection decreasing gradually from the center toward the edge.

In testimony whereof I affix my signature in the presence of two witnesses.

EUGENE E. BARTHOLOMEW.

Witnesses:
J. B. HULL,
E. M. L. HADIG.